Nov. 22, 1955
G. C. AKERLOF
2,724,692
APPARATUS FOR CONVERTING VOLATILIZABLE
METAL CHLORIDES TO METALS
Filed Jan. 21, 1953
3 Sheets-Sheet 1
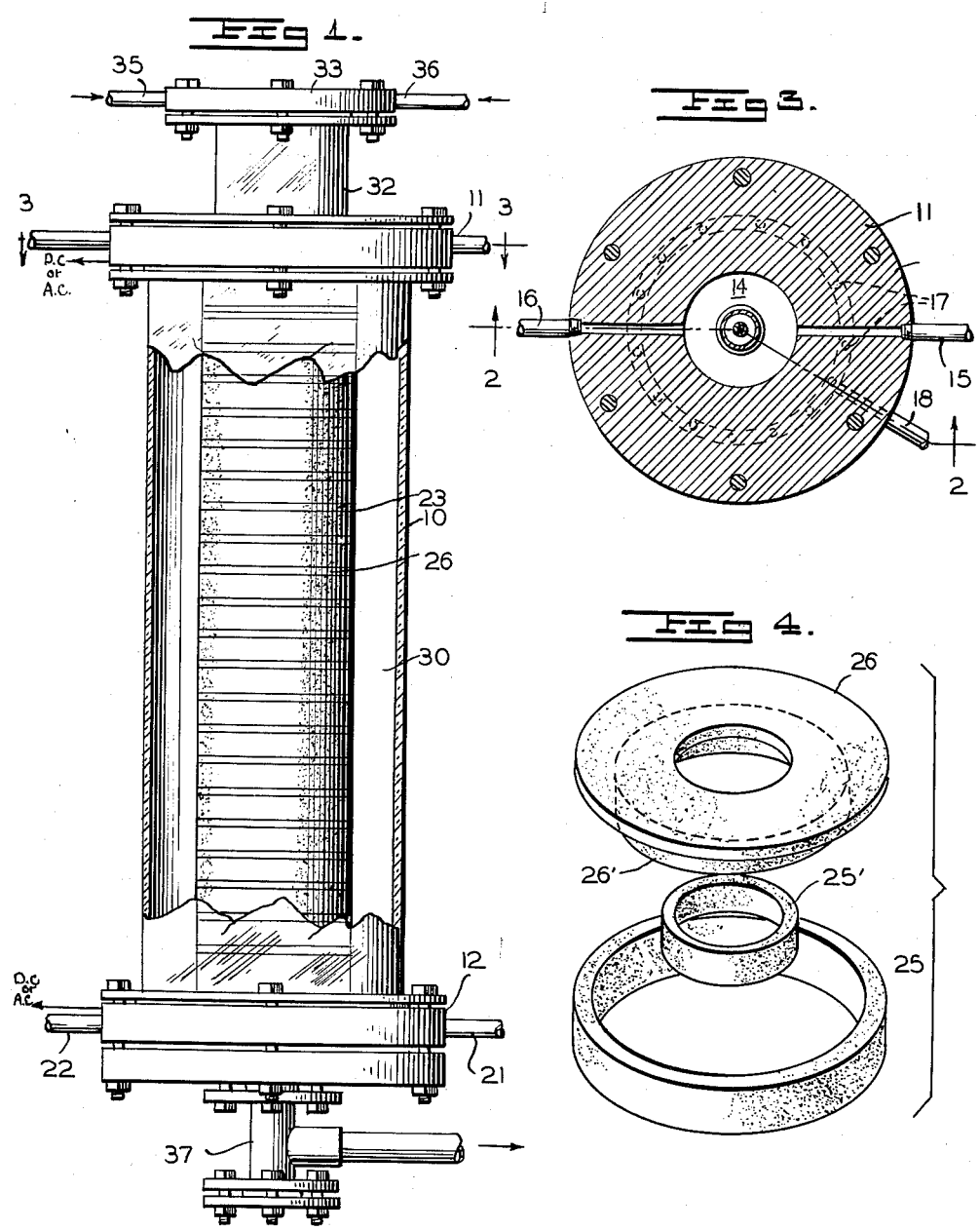
INVENTOR
GOSTA C. AKERLOF
BY Harold T. Stowell
ATTORNEY

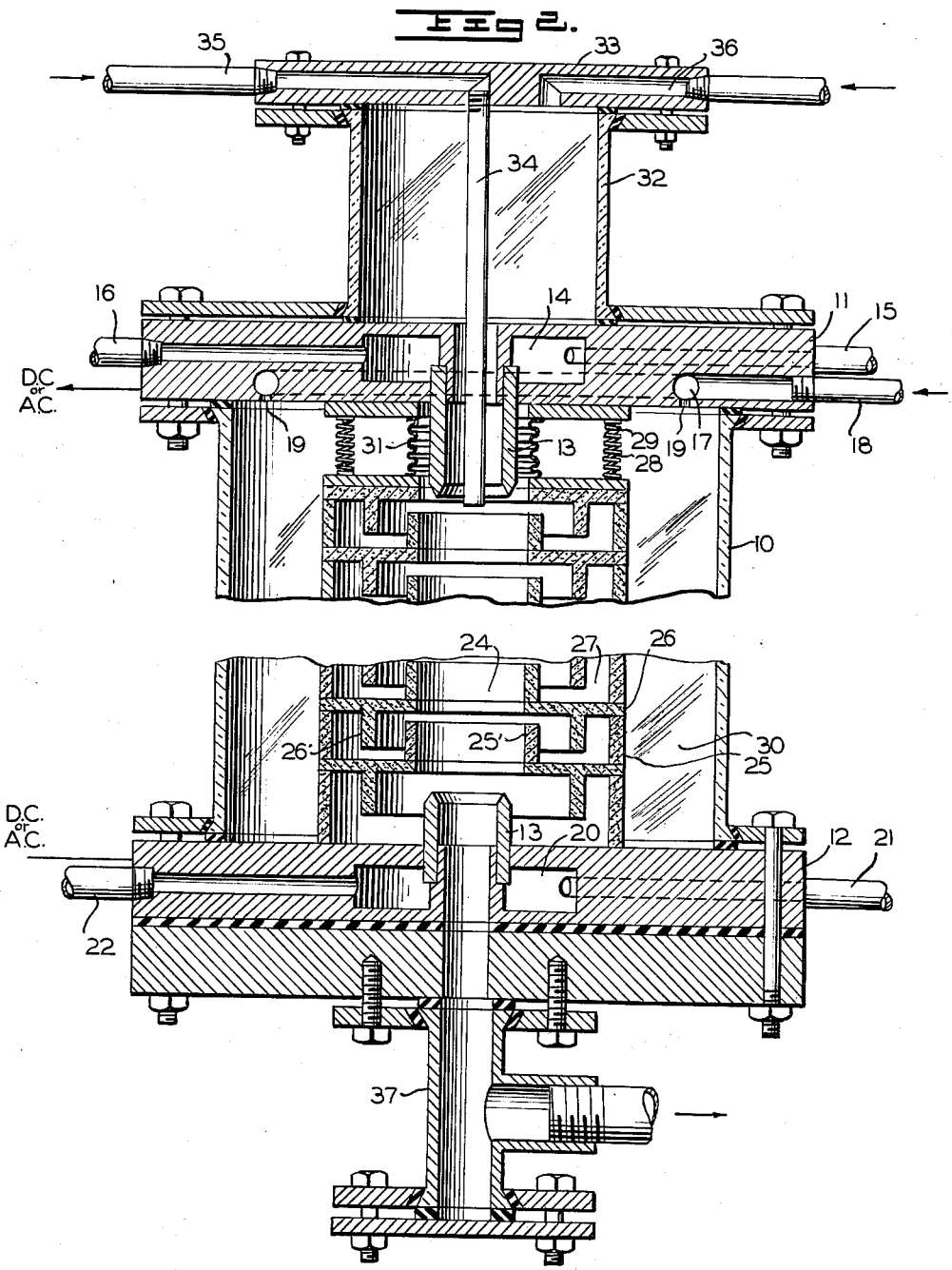

Nov. 22, 1955     G. C. AKERLOF     2,724,692
APPARATUS FOR CONVERTING VOLATILIZABLE
METAL CHLORIDES TO METALS
Filed Jan. 21, 1953     3 Sheets-Sheet 3

INVENTOR
GOSTA C. AKERLOF

BY Harold T. Stowell

ATTORNEY

United States Patent Office 2,724,692
Patented Nov. 22, 1955

2,724,692

APPARATUS FOR CONVERTING VOLATILIZABLE METAL CHLORIDES TO METALS

Gosta C. Akerlof, Plainsboro, N. J., assignor, by mesne assignments, to the United States of America as represented by the Secretary of the Navy Application January 21, 1953, Serial No. 332,171

1 Claim. (Cl. 204—312)

This invention relates to a method and apparatus for converting volatilizable metal chlorides to the corresponding metals by reaction with hydrogen in an electrical discharge.

In attempting to convert metal chlorides by passing a mixture of the chlorides and hydrogen through an electrical discharge in accordance with the equation $$MCl_n + n/2 H_2 \rightarrow M + nHCl$$

serious difficulties are encountered because of the deposition of metal in the reaction zone. The highly conducting deposits rapidly increase to an amount which carries all the current in the reaction zone, extinguishing the gaseous discharge and practically stopping chemical reaction in the gas phase.

This disadvantage is overcome, and practical and economic operation of the electrical discharge reduction process is obtained by the method and apparatus of the invention which embody the novel principle of blanketing the surfaces on which metal might deposit in the reaction zone with a layer of hydrogen gas. This is advantageously effected by encasing the reaction zone with wall members of a gas-permeable material through which hydrogen is passed to maintain a continuous stream of hydrogen along the inner surfaces of the members.

The method and apparatus of the invention are particularly suitable for the conversion of titanium tetrachloride into metallic titanium, and the principles of the invention will be more particularly described with specific reference to the production of titanium and with reference to the accompanying drawings in which:

Fig. 1 is an elevation, with portions of the outer wall broken away, of an electrical discharge reduction furnace embodying the principles of the invention;

Fig. 2 is an enlarged vertical section of the furnace of Fig. 1;

Fig. 3 is a horizontal section in line 3—3 of Fig. 1;

Fig. 4 is an enlarged exploded perspective view of the members defining the discharge passage of the furnace of Fig. 1.

Figure 5:
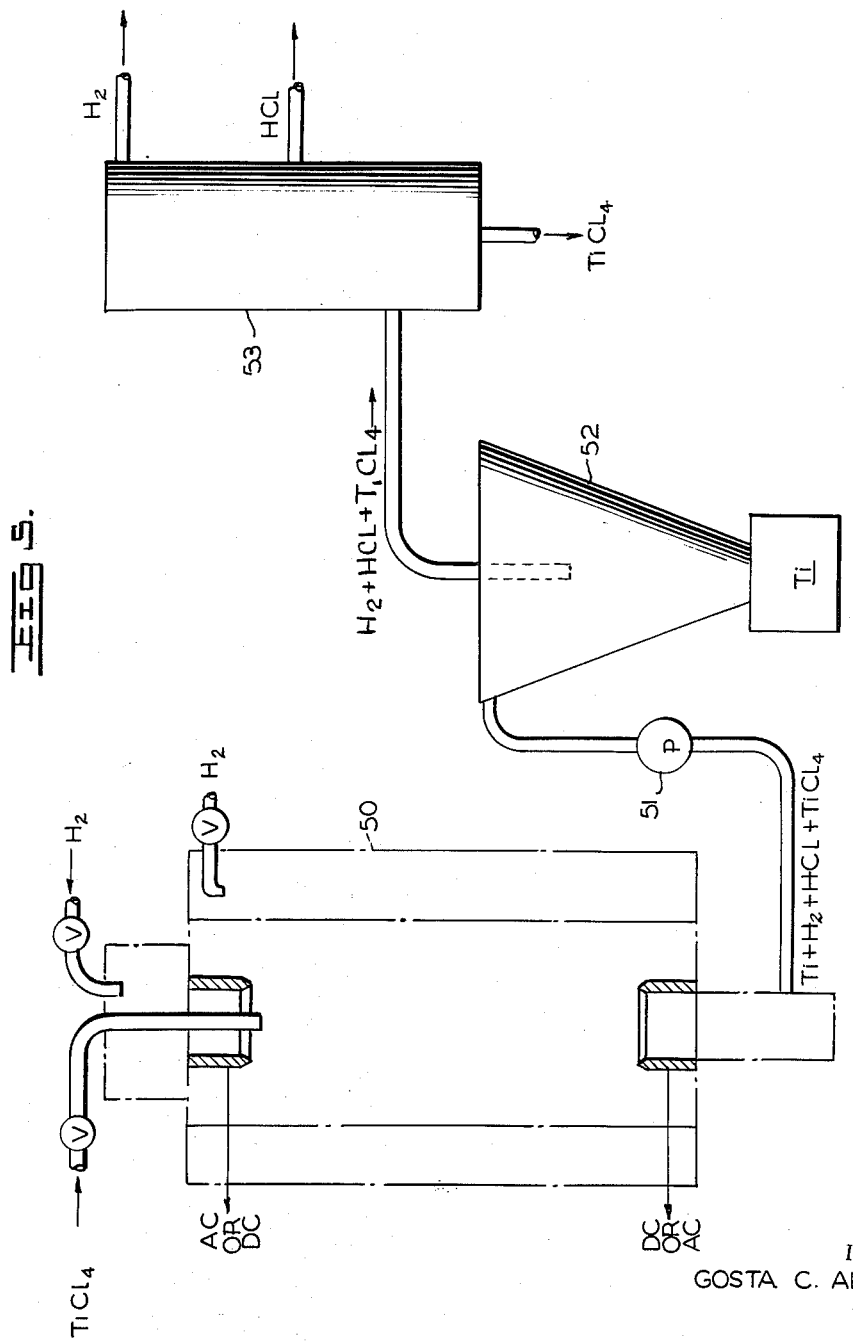
Fig. 5 is a diagrammatic flow sheet of a process embodying the principles of the invention.

In Figs. 1-4, 10 is a glass cylinder forming the outer walls of the reaction chamber. Cylinder 10 is mounted between top and bottom head plates 11 and 12, respectively, which carry the cylindrical discharge-forming copper electrodes 13. Head plate 11 is provided with an annular coolant channel 14 having inlet and outlet ports 15, 16, and with an annular hydrogen channel 17 having a supply port 18 and a plurality of outlet ports 19. Head plate 12 is provided with a annular coolant channel 20 having inlet and outlet ports 21, 22.

Concentrically positioned within the cylinder 10 is a cylindrical column 23 defining a central gas passage 24 extending between the electrodes 13, and an outer annular space 30. The colum 23 is built up of a plurality of ring members 25, 25' and annular plate members 26 having depending baffle rings 26' to define an outer wall structure and baffled gas passages 27 extending from the outer wall to the central gas passage 24.

The ring members 25, 25' and ring members 26 are made of a gas-permeable, heat-resistant insulating material having a low coefficient of expansion such as lava, unglazed porcelain or sintered alumina. The column 23 is resiliently supported from head plate 11 by means of a plurality of springs 28 positioned around pins 29 and the gas passage 24 is sealed off from the annular space 30 at the upper end of the column by means of expansible bellows member 31.

Glass or metal cylinder 32 provides a feed chamber at the upper end of the furnace. It is closed by end plate 33 carrying inlet pipe 34 connected to inlet port 35 for supplying vaporized metallic chloride or a mixture of metallic chloride and hydrogen. Inlet pipe 34 preferably extends down gas passage 24 beyond the upper electrode 13. End plate 33 is also provided with a passage 36 through which hydrogen may be supplied to gas passage 34.

Attached to the lower head plate 12 is a glass or metal T 37 providing an outlet for the furnace.

As shown more particularly in flow diagram Fig. 5, the outlet of reduction furnace 50, shown in detail in Figs. 1-4, is connected through a suction pump or fan 51, to a separator 52, such as a cyclone separator or bag filter, wherein the metallic particles suspended in the reaction gases are removed. From the separator the gaseous mixture of hydrogen, hydrogen chloride, and unreacted metal chloride pass to a gas fractionator 53 wherein the hydrogen chloride and metal chloride are separated from the hydrogen. The hydrogen and separated metal chloride are returned to the process.

In the operation of the apparatus to produce metallic titanium, a direct or alternating current voltage of, for example, about 400 volts per inch is impressed between electrodes 13, a mixture of titanium tetrachloride and hydrogen is fed into the upper end of the electric discharge passage 24, and hydrogen is supplied to annular space 30.

The reactants are drawn through the discharge passage 24 and the hydrogen is drawn from annular space 30 into the passage by means of the suction pump 51 (Fig. 5), the pressure in the gas passage 24 being maintained by suitable adjustment of valves in the feed lines within the subatmospheric range at which a glow electric discharge passes between electrodes 13 under the impressed potential. The titanium tetrachloride is reduced to metallic titanium in the form of fine particle which are carried along in the stream of hydrogen and resulting hydrogen chloride to the recovery apparatus. The hydrogen diffusing through the permeable walls of column 23 into the baffled annular passages 27 flows into passage 24 through the inner ends of passages 27 and maintains a continuously renewed barrier stream of hydrogen along the inner surfaces of passage 24 which effectively prevents the deposition of metallic titanium on these surfaces and makes possible continuous operation of the apparatus for extended periods.

I claim:

Apparatus for converting volatilizable metal chlorides to the corresponding metals by reaction with hydrogen comprising gas-impermeable cylindrical wall means defining an elongated chamber, gas-permeable, heat-resistant insulating wall members defining an elongated gas passage within said chamber and spaced from said gas-impermeble wall means to define an annular space between the gas-permeable wall members and the gas-impermeable wall means, said gas-permeable members comprising an outer gas-permeable wall adjacent said annular space and a plurality of annular tortuous passages from the inner surface of said outer gas-permeable wall to said elongated passage, resilient members supporting said gas-permeable members, electrode members at each end of said elongated passage, means for maintaining an electrical potential between said electrode members, means for introducing gaseous reactants through said elongated passage, means for introducing hydrogen into said annular space, and suction means for drawing said gaseous reactants through said elongated passage and for drawing hydrogen inwardly through said gas-permeable wall members into said inner zone.

References Cited in the file of this patent

UNITED STATES PATENTS

| | | |
|---|---|---|
| 1,046,043 | Weintraub | Dec. 3, 1912 |
| 1,334,962 | Niece et al. | Mar. 30, 1920 |
| 1,400,959 | Koetschet | Dec. 20, 1921 |
| 1,768,179 | Welch | June 24, 1930 |
| 2,012,015 | McRae | Aug. 20, 1935 |